(12) United States Patent
Abuelsaad et al.

(10) Patent No.: US 9,813,423 B2
(45) Date of Patent: Nov. 7, 2017

(54) TRUST-BASED COMPUTING RESOURCE AUTHORIZATION IN A NETWORKED COMPUTING ENVIRONMENT

(71) Applicant: International Business Machines Corporation, Armonk, NY (US)

(72) Inventors: Kelly Abuelsaad, Poughkeepsie, NY (US); Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 13/777,615

(22) Filed: Feb. 26, 2013

(65) Prior Publication Data

US 2014/0245394 A1 Aug. 28, 2014

(51) Int. Cl.
*H04L 29/06* (2006.01)
*H04L 9/32* (2006.01)

(52) U.S. Cl.
CPC .............. *H04L 63/104* (2013.01); *H04L 9/32* (2013.01); *H04L 63/08* (2013.01); *H04L 63/10* (2013.01)

(58) Field of Classification Search
CPC ............ H04L 63/08; H04L 63/10; H04L 9/32
See application file for complete search history.

(56) References Cited

U.S. PATENT DOCUMENTS

| | | |
|---|---|---|
| 7,039,688 B2 | 5/2006 | Matsuda et al. |
| 7,107,610 B2 | 9/2006 | Lortz |
| 7,990,896 B1 | 8/2011 | Delker et al. |
| 8,150,429 B1 * | 4/2012 | Zheng ........................ 455/466 |
| 8,196,175 B2 | 6/2012 | Reed et al. |
| 8,245,270 B2 | 8/2012 | Cooperstein et al. |
| 8,341,269 B2 | 12/2012 | Balani et al. |

(Continued)

FOREIGN PATENT DOCUMENTS

| | | |
|---|---|---|
| CN | 1719780 A | 1/2006 |
| WO | 2012075496 A2 | 6/2012 |

OTHER PUBLICATIONS

Chao, The Pros and Cons of Virtual Machines in the Datacenter, Jan. 30, 2006, DevX.com, 3 pages total.*

(Continued)

*Primary Examiner* — Farid Homayounmehr
*Assistant Examiner* — Christopher C Harris
(74) *Attorney, Agent, or Firm* — William H. Hartwell; Hunter E. Webb; Keohane & D'Alessandro PLLC

(57) ABSTRACT

A trust-based approach for authorizing computing resources in a networked computing environment is provided. Specifically, in a typical embodiment, a candidate computing resource (e.g., a virtual machine) will submit a request to join a network computing environment ("environment"). Based on the request, a message will be communicated to previously authorized/joined computing resources to poll/solicit their votes as to whether the candidate computing resource should be trusted/authorized in the environment. Based on the responses submitted by the polled computing resources, the candidate computing resource may be authorized or denied membership in the environment. If authorized, a permission level may be set (e.g., as recommended by the polled computing resources).

16 Claims, 8 Drawing Sheets

(56) References Cited

U.S. PATENT DOCUMENTS

| | | | |
|---|---|---|---|
| 8,352,608 B1 | 1/2013 | Keagy et al. | |
| 2004/0019807 A1* | 1/2004 | Freund | 713/201 |
| 2004/0098606 A1 | 5/2004 | Tan et al. | |
| 2004/0254984 A1* | 12/2004 | Dinker | 709/205 |
| 2005/0114650 A1* | 5/2005 | Rockwood et al. | 713/155 |
| 2006/0200571 A1* | 9/2006 | Backman | 709/230 |
| 2008/0282327 A1* | 11/2008 | Winget et al. | 726/4 |
| 2009/0287827 A1 | 11/2009 | Horn et al. | |
| 2009/0319688 A1 | 12/2009 | Mason et al. | |
| 2010/0313246 A1* | 12/2010 | Irvine et al. | 726/4 |
| 2012/0216247 A1* | 8/2012 | Gross et al. | 726/1 |
| 2012/0303790 A1* | 11/2012 | Singh et al. | 709/224 |
| 2012/0311672 A1 | 12/2012 | Connor et al. | |

OTHER PUBLICATIONS

Maitland, J., "Keeping Control Isn't Easy", Chapter 4: Cloud-Based Infrastructure, Search-CloudConnputing.com, 13 pages.

Mell, P. et al., "The NIST Definition of Cloud Computing", National Institute of Standards and Technology, Information Technology Laboratory, Vers. 15, Oct. 7, 2009, 2 pages.

Yu, Bai, PCT Notification of Transmittal of the International Search Report and the Written Opinion of the International Searching Authority or the Declaration, International Application No. PCT/IB2014/058903, dated Jun. 11, 2014, 5 pages.

Maitland, J., "Keeping Control Isn't Easy", Chapter 4: Cloud-Based Infrastructure, SearchCloudComputing.com, Publication Date: Oct. 2009, 19 pages.

\* cited by examiner

US 9,813,423 B2

TRUST-BASED COMPUTING RESOURCE AUTHORIZATION IN A NETWORKED COMPUTING ENVIRONMENT

TECHNICAL FIELD

In general, embodiments of the present invention relate to computing resource (e.g., virtual machines, nodes, etc.) authorization. Specifically, embodiments of the present invention relate to trust-based authorization of computing resources in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Cloud technologies typically enable highly dynamic topologies of computing resources linked by network resources. In contrast to traditional environments (e.g., data centers), these topologies may evolve quickly in response to various demands. As such, management of such environments should be autonomous and minimize any bottleneck of human configuration and verification. Challenges may exist, however, when a resource such as a server is added to a network. Specifically, there may be elements of the process that require a human administrator to physically install the hardware, configure the operating system, attach the resource to the network, etc. Such a process may be inefficient and subject to errors.

SUMMARY

Embodiments of the present invention relate to a trust-based approach for authorizing computing resources in a networked computing environment. Specifically, in a typical embodiment, a candidate computing resource (e.g., a virtual machine (VM)) will submit a request to join a network computing environment ("environment"). Based on the request, a message will be communicated to previously authorized/joined computing resources to poll/solicit their votes as to whether the candidate computing resource should be trusted/authorized in the environment. Based on the responses submitted by the polled computing resources, the candidate computing resource may be authorized or denied membership in the environment. If authorized, a permission level may be set (e.g., as recommended by the polled computing resources).

A first aspect of the present invention provides a computer-implemented method for trust-based computing resource authorization in a networked computing environment, comprising: receiving, in a computer memory medium, a request for a candidate computing resource to join the networked computing environment; identifying a set of authorizing computing resources previously joined to the networked computing environment; communicating an authorization message to the set of authorizing computing resources, the authorization message comprising metadata describing a set of attributes of the candidate computing resource; receiving a set of responses from the set of authorizing computing resources, the set of responses comprising a set of votes responsive to the request of the candidate computing resource to join the networked computing environment; and making an authorization determination for the candidate computing resource to join the networked computing environment based on the set of votes.

A second aspect of the present invention provides a system for trust-based computing resource authorization in a networked computing environment, comprising: a bus; a processor coupled to the bus; and a memory medium coupled to the bus, the memory medium comprising instructions to: receive, in a computer memory medium, a request for a candidate computing resource to join the networked computing environment; identify a set of authorizing computing resources previously joined to the networked computing environment; communicate an authorization message to the set of authorizing computing resources, the authorization message comprising metadata describing a set of attributes of the candidate computing resource; receive a set of responses from the set of authorizing computing resources, the set of responses comprising a set of votes responsive to the request of the candidate computing resource to join the networked computing environment; and make an authorization determination for the candidate computing resource to join the networked computing environment based on the set of votes.

A third aspect of the present invention provides a computer program product for trust-based computing resource authorization in a networked computing environment, the computer program product comprising a computer readable storage media, and program instructions stored on the computer readable storage media, to: receive, in a computer memory medium, a request for a candidate computing resource to join the networked computing environment; identify a set of authorizing computing resources previously joined to the networked computing environment; communicate an authorization message to the set of authorizing computing resources, the authorization message comprising metadata describing a set of attributes of the candidate computing resource; receive a set of responses from the set of authorizing computing resources, the set of responses comprising a set of votes responsive to the request of the candidate computing resource to join the networked computing environment; and make an authorization determination for the candidate computing resource to join the networked computing environment based on the set of votes.

A fourth aspect of the present invention provides a method for deploying a system for trust-based computing resource authorization in a networked computing environment, comprising: providing a computer infrastructure being operable to: receive, in a computer memory medium, a request for a candidate computing resource to join the networked computing environment; identify a set of authorizing computing resources previously joined to the networked computing environment; communicate an authorization message to the set of authorizing computing resources, the authorization message comprising metadata describing a set of attributes of the candidate computing resource; receive a set of responses from the set of authorizing computing resources, the set of responses comprising a set of votes responsive to the request of the candidate computing resource to join the networked computing environment; and make an authorization determination for the candidate computing resource to join the networked computing environment based on the set of votes.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION

Figure 1:
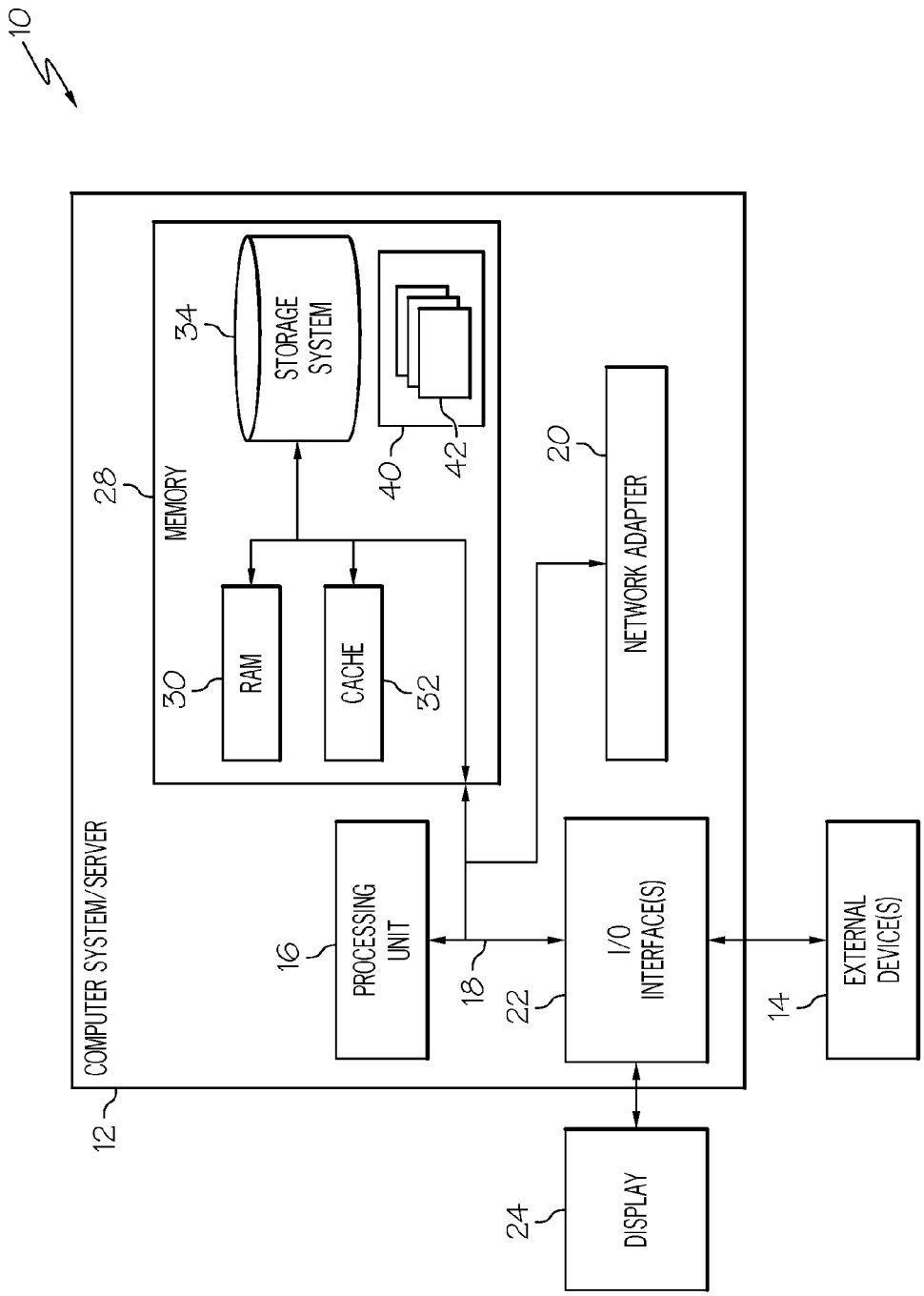
FIG. 1 depicts a cloud computing node according to an embodiment of the present invention.

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention relate to a trust-based approach for authorizing computing resources in a networked computing environment. Specifically, in a typical embodiment, a candidate computing resource (e.g., a virtual machine (VM)) will submit a request to join a network computing environment ("environment"). Based on the request, a message will be communicated to previously authorized/joined computing resources to poll/solicit their votes as to whether the candidate computing resource should be trusted/authorized in the environment. Based on the responses submitted by the polled computing resources, the candidate computing resource may be authorized or denied membership in the environment. If authorized, a permission level may be set (e.g., as recommended by the polled computing resources).

Along these lines, this approach is based on a "web" of trust that allows the system to grow or contract elastically, rapidly, and automatically based on a "democratic" model of its constituent resources. This may reduce the amount of pre-configuration required by a human or a cloud provider, and builds on key benefits of cloud computing (e.g., automation, elasticity, and rapid response to changing business needs).

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
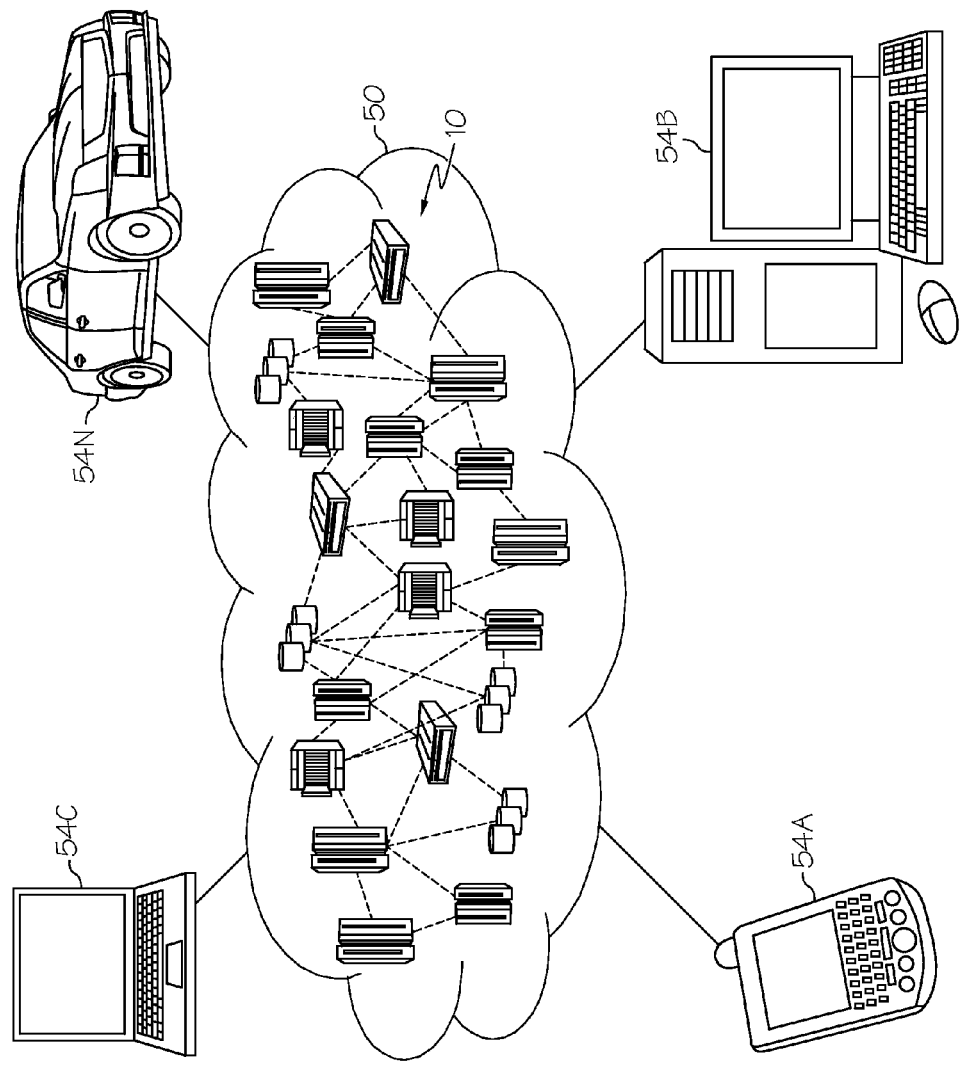
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
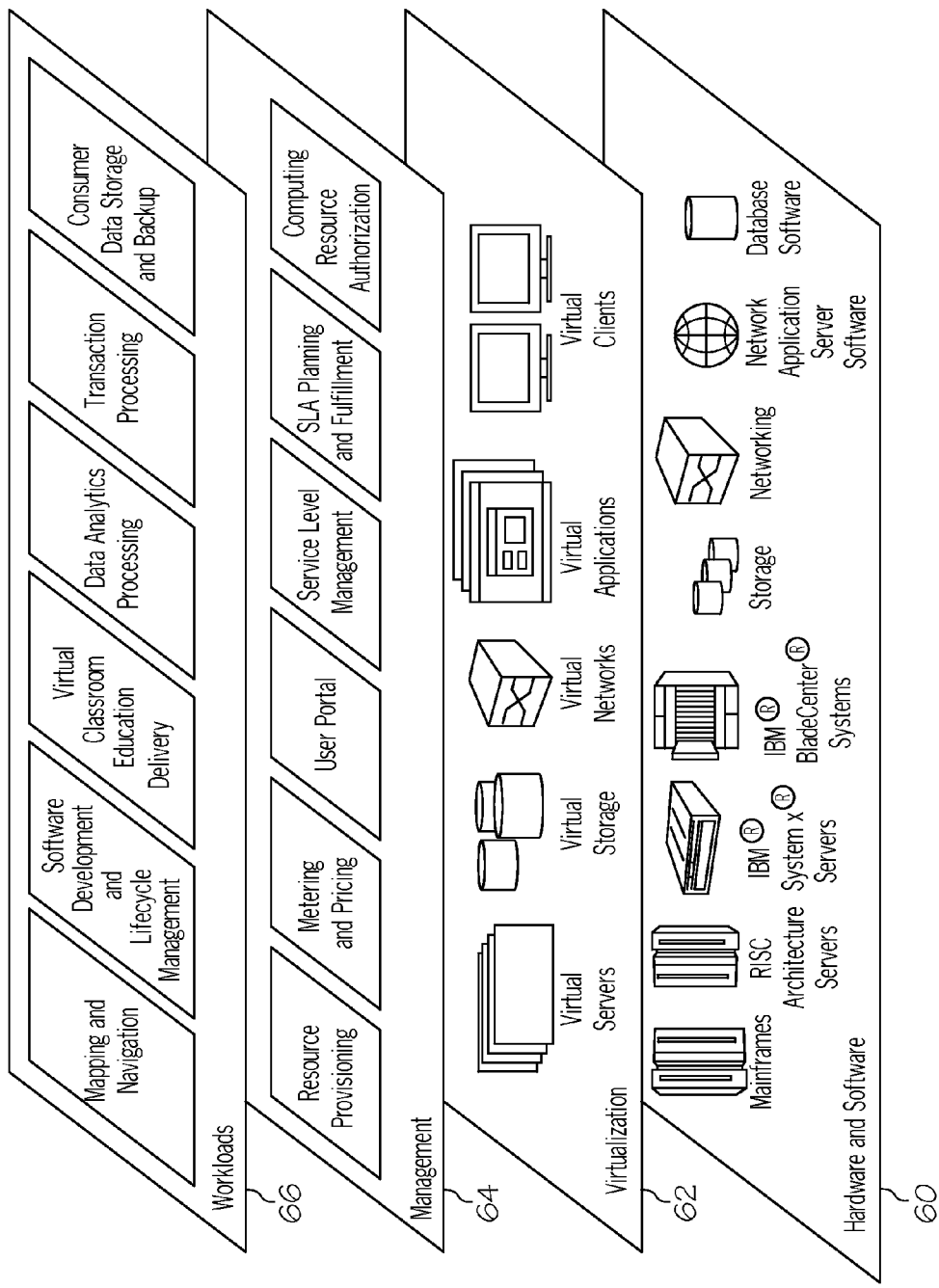
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM System P® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, System z, System p, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is computing resource authorization, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the computing resource authorization functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
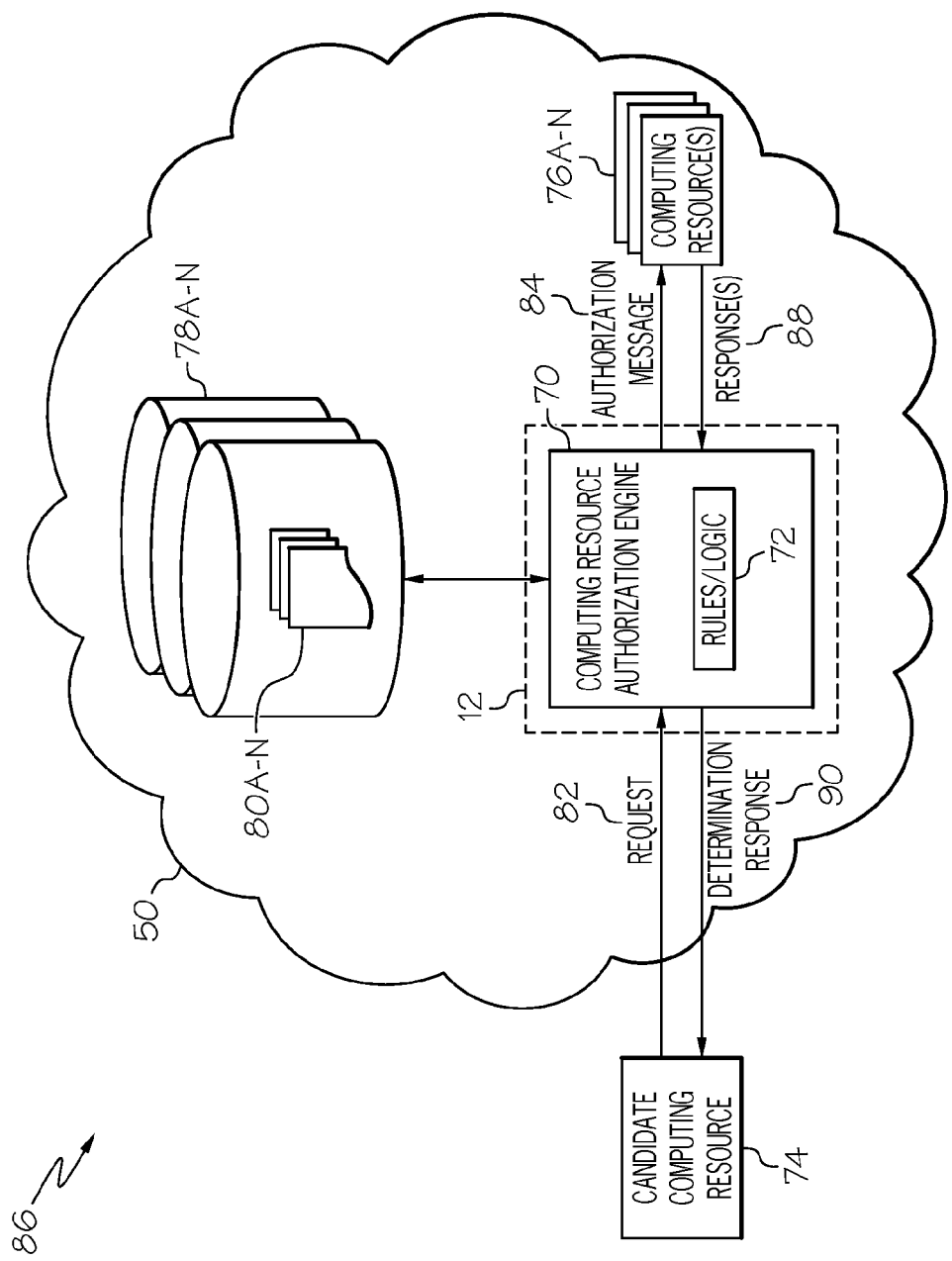
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A computer system/server 12, which can be implemented as either a stand-alone computer system or as a networked computer system is shown in FIG. 4. In the event the teachings recited herein are practiced in a networked computing environment 86, each client need not have a computing resource authorization engine (engine 70). Rather, engine 70 could be loaded on a server or server-capable device that communicates (e.g., wirelessly) with the clients to provide trust-based computing resource authorization functionality. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides trust-based computing resource authorization hereunder.

Along these lines, engine 70 may perform multiple functions similar to a general-purpose computer. Specifically, among other functions, engine 70 may (among other things): receive, in a computer memory medium, a request 82 for a candidate computing resource 74 (e.g., a VM) to join the networked computing environment 86; identify a set of authorizing computing resources 76A-N (e.g., VMs) previously joined to the networked computing environment 86; communicate an authorization message 84 to the set of authorizing computing resources 76A-N, the authorization message comprising metadata describing a set of attributes of the candidate computing resource 74; receive a set of responses 88 from the set of authorizing computing resources 76A-N, the set of responses comprising a set of votes (e.g., comprising a set of codes having associated voting decisions) responsive to the request of the candidate computing resource 74 to join the networked computing environment 86 (e.g., the set of responses comprising a set of qualifiers that suggest a set of permission levels for the candidate computing resources, the set of qualifiers setting forth a set of priorities for the set of votes); make an authorization determination for the candidate computing resource 74 to join the networked computing environment 86 based on the set of votes (e.g., and optionally on a set of policies 80A-N stored in computer storage device(s) 78A-N); set an authorization level for the candidate computing resource 74 based on the suggested set of permission levels; return a response 90 to the candidate computing resource 74, the response identifying the authorization level.

In accordance with these functions, assume that a newly provisioned resource connects to a network. Further assume that the resource has no inherent security credentials provided and is provisioned from a generic image template by a hypervisor. The system herein recognizes that the resource has been added (e.g., via DHCP or similar protocol) and polls the resource to find out what capabilities or configuration the resource may have. The system may then query the network to ask if any existing resources can "vouch" for the new resource (providing the existing resources with information about the newly added resource, such as the resource's MAC address, operating system, installed middleware, or other characteristics to help guide their decision). Regardless, the resources previously authorized on the network respond with their votes and suggested level of access (e.g., the existing resources may be aware that this system is expected to join the system, to replace a defunct system, or to scale the system up). In addition, the existing resources may "claim/request" the new resource to be added to their network. If more than one existing resource attempts to claim the new resource, the existing resources may decide who has priority based on SLA details, needs of the existing resources, a randomized priority system, etc. In any event, if a quorum of the existing resources votes to authorize the new resource on the network, the new resource is granted access to the network and any resources on the network for which the trusting systems suggest.

Illustrative Example

Figure 5:
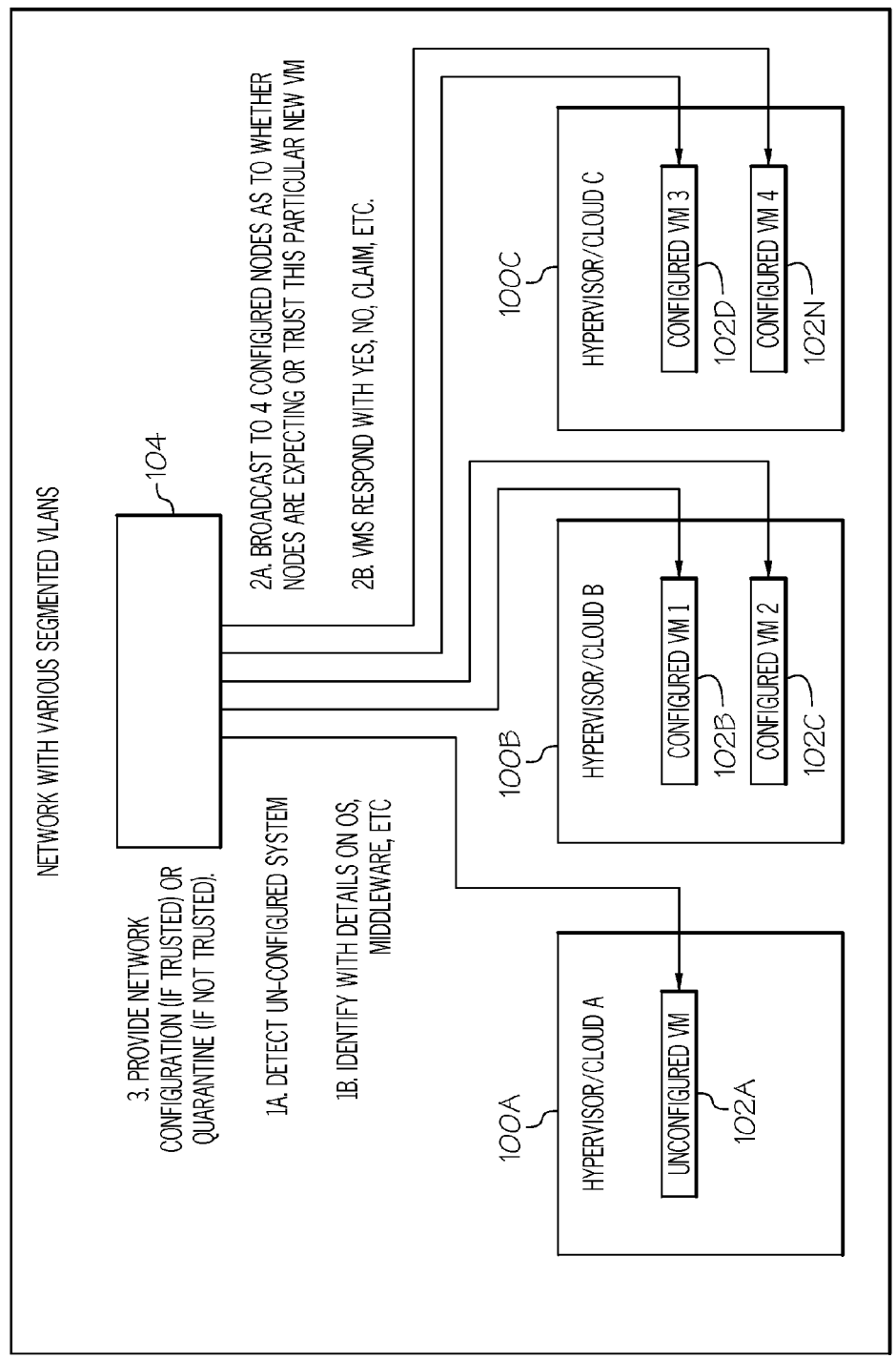
FIG. 5 depicts an illustrative authorization scenario according to an embodiment of the present invention.

This section will describe an illustrative example based on the above teachings. It is understood that the scenario(s) set forth below are intended to be illustrative only and that other variations may be implemented hereunder. Referring to FIG. 5, an illustrative scenario is shown. As depicted, a hypervisor 100A having an un-configured VM/node 102A is attempting to join a network in common with hypervisors 100B-C (having VMs/nodes 102B-N) as shown). In such a scenario, network monitoring system 104 (e.g., implemented as program 40 of FIG. 1 and/or engine 70 of FIG. 4) will facilitate the steps shown. For example, the un-configured node 102A will be detected by system 104 and corresponding details thereof will be identified (e.g., operating system (OS), middleware, etc.). Is response, system 104 will broadcast to the configured nodes 102B-N as to whether configured nodes 102B-N are expecting or trust un-configured node 102A. Configured nodes 102B-N then respond to the broadcast with their votes and/or suggested permission level for node 102A. Based on the responses from configured nodes 102B-N, system 104 will make a configuration/authorization determination for un-configured node 102A.

Figure 6:
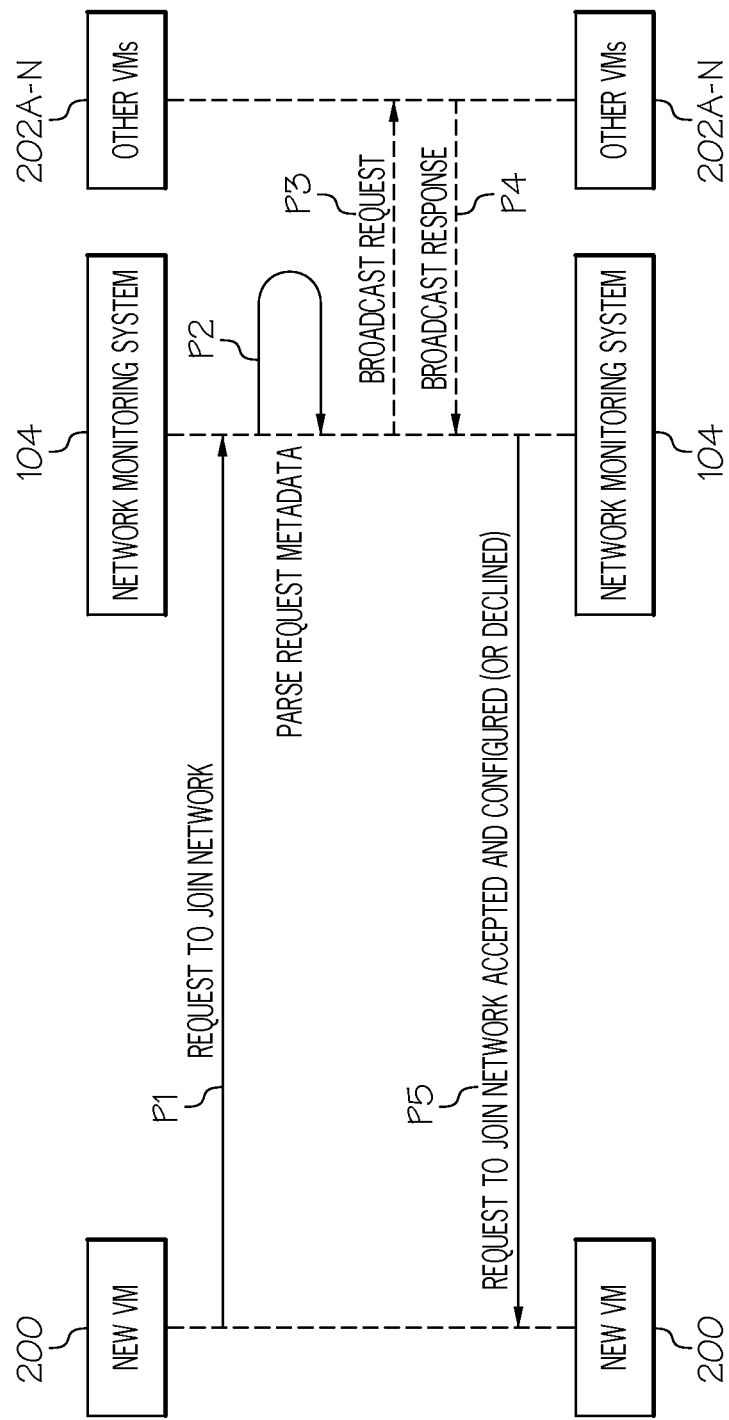
FIG. 6 depicts an illustrative communication sequence according to an embodiment of the present invention.

This process is shown and described in greater detail in conjunction with the sequence of communication diagram of FIG. 6. In step P1, a new VM (VM) 200 requests to join a network using a protocol such as DHCP and provides contextual metadata about itself. In step P2, system 104 receives the request and parses out relevant metadata in order to determine what VMs 202A-N it should broadcast to in order to allow this VM 200 on the network. In accordance with this step, system 104 may determine how to populate the broadcast message format values. In any event, system 104 broadcasts the message to the complete or subset of configured VMs 202A-N on its network domain in step P3. In step P4, VMs 202A-N read the message and send back a response with their "vote" indicating: (1) a message response code (e.g., allow VM 200 on the network, do not allow VM 200 on the network, abstain, or ask for the VM 200 to be configured for a particular VM 202A-N to use); (2) a set of qualifiers with a suggested voting priority; and/or (3) a suggested permission level/clearance for VM 200. Regardless, system 104 makes an authorization determination with corresponding permission (if authorization is given) in step P5.

In general, the message broadcast to VMs 202-N may have a predetermined format. For example, the message should include some information about VM 200 such as client capabilities (e.g., operating system specifications, virtual hardware (e.g., CPU, RAM, disk, network speed), middleware installed, protocols implemented, etc.). The message may also have client location information such as network address, hardware address, geographical location, etc. Still yet, the message may have client dependency information such as message metadata (e.g., identification, time to live (TTL), etc.).

The responses generated by VMs 202A-N may have a response code such as YES, NO, ABSTAIN, CLAIM or other added codes. The responses may have various conditions or qualifiers (e.g., a desired priority of votes, etc.). Further yet, the responses may suggest a particular permission level for VM 200.

In tabulating results based on the responses, system 104 may implement the following algorithm:
1. Set a default score of 0 and do not allow new VM onto the network if the score is 0 or lower.
2. Receive a number of votes before a TTL value on the broadcast request message.
3. Determine the aggregate score based on the values of the responses, the weight of the respondents, and any sort of relative qualifiers.
   a. By default, each VM can vote YES or CLAIM (1 pt), NO (−1 pt) or ABSTAIN (0). If the VM doesn't respond before the TTL, this counts as a 0.
      i. Example reasons a VM may vote YES or CLAIM: The VM is a cluster manager that is expecting a new VM to replace a failed node, or the VM automatically assimilates new nodes as they become available, etc.
      ii. Example reasons a VM would vote NO: The new VM has a back-level OS or patch level that make it a threat to the network, or it is known to consume too much bandwidth, or the voting system may refer another more appropriate network, etc.
   b. Individual VMs can be configured to have weightier votes (positive or negative) or vetoes (infinite negative pts).
      i. Example reasons to veto include the NO vote above, plus any sort of capacity rules, such as a veto node is expecting a different new node to join the network, and it needs to have room for that system.
   c. After the TTL expires, all received votes are tallied and any of qualifiers may be considered. Example qualifiers may include:
      i. If I'm the only YES vote, then don't let me be the sole determiner.
      ii. If I'm not the only claim vote, here's my priority to help determine who should get the resource.
      iii. Any explicit firewall configuration requests to reduce network access.
4. Based on the aggregate score, if the score is greater than 0, the new VM may be granted access to the network.

Figure 7:
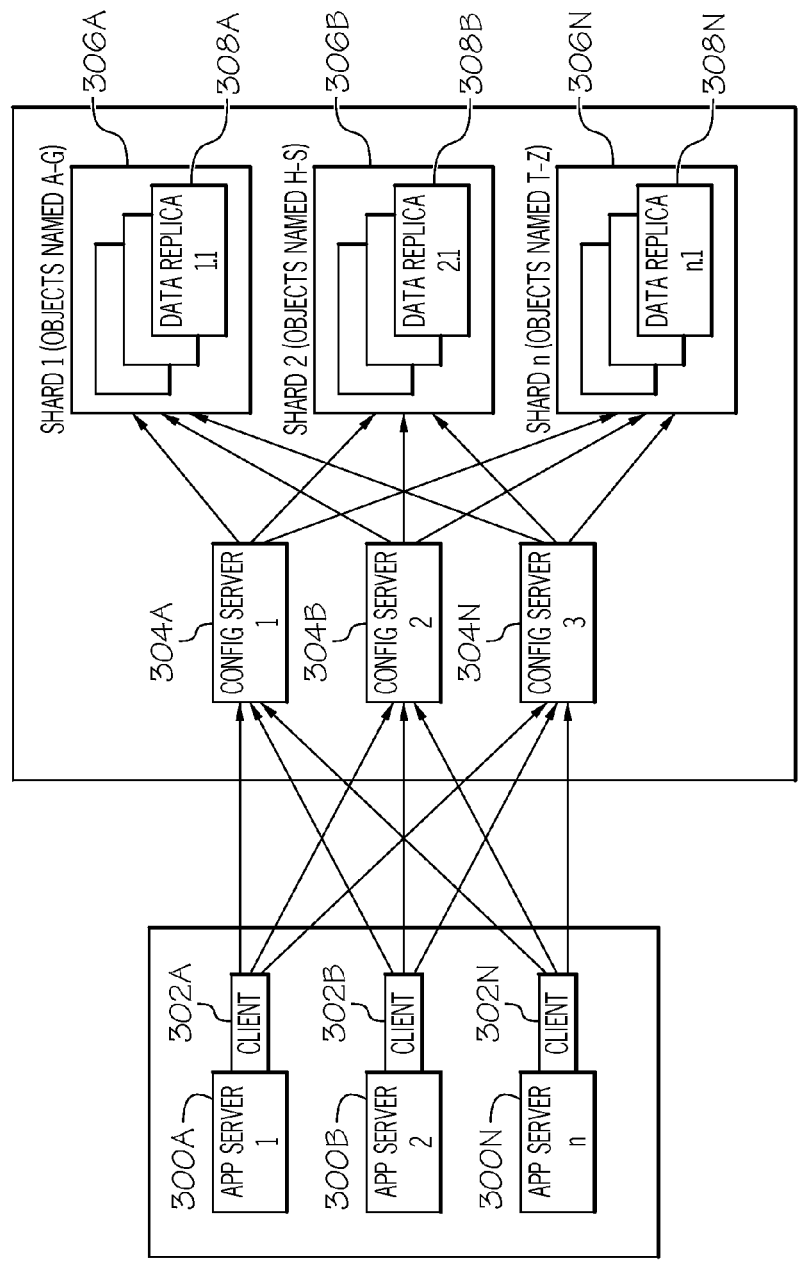
FIG. 7 depicts an illustrative sharded database configuration according to an embodiment of the present invention.

It is understood that similar teachings may be applied to a structured query language database (NoSQL) cluster. An example of this is shown in FIG. 7. As depicted, a set of application servers 300A-N are associated with clients 302A-N to interact with configuration servers 304A-N, which in turn access database shards 306A-N having data set replicas 308A-N. Assume in one example that the system shown in FIG. 7 is a highly elastic system, starting with 12 nodes (3 configuration servers and 3 shards, each with 3 replicas in a set) and scaling to 73 nodes (3 configuration servers and 10 shards, each with 7 replicas in a set). By initial design, assume that the system uses VMs, but makes up for errors via replica sets. This system may expect to lose VMs/nodes regularly, and instead of trying to recover them, the system attempts to find new resources provisioned on the network, on which it then copies data to fill in the gaps.

Under the teachings described herein, if a new VM joins this system/network that is capable of serving as a high RAM, high capacity database (DB), and the network is not at maximum capacity, the network may vote accordingly. If the system is at full capacity, it may vote YES, but not claim the VM (e.g., perhaps adding metadata that states it will use the VM as a standby if no other network claims the new VM). If a VM joins the network that is not suitable as a high capacity DB node (low RAM), the other nodes/VMs may vote ABSTAIN or NO, and perhaps include metadata that the new VM is not to broadcast any network data to its systems.

Figure 8:
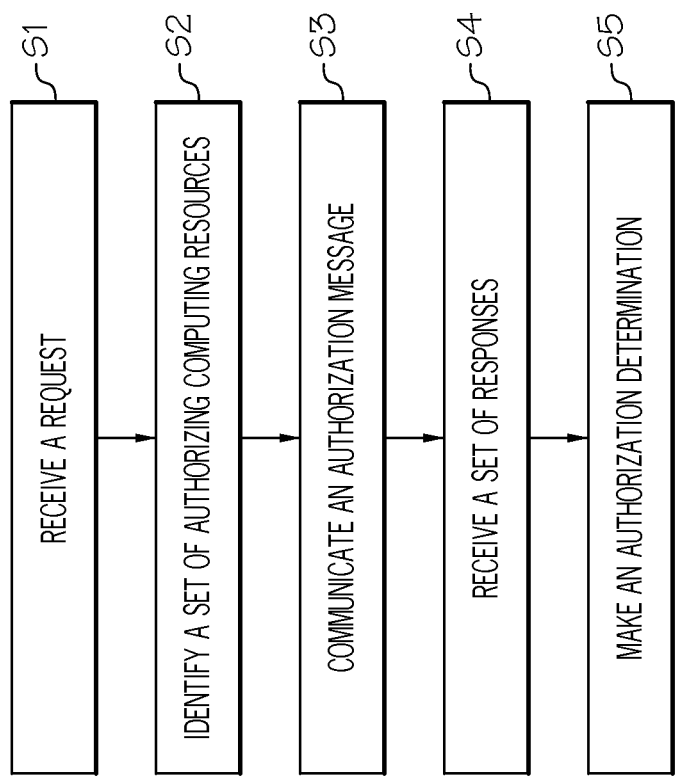
FIG. 8 depicts a method flow diagram according to an embodiment of the present invention The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

Referring now to FIG. 8, a method flow diagram according to an embodiment of the present invention is shown. In step S1 a request is received in a computer memory medium for a candidate computing resource to join the networked computing environment. In step S2, a set of authorizing computing resources previously joined to the networked computing environment is identified. In step S3, an authorization message is communicated to the set of authorizing computing resources, the authorization message comprising metadata describing a set of attributes of the candidate computing resource. In step S4, a set of responses is received from the set of authorizing computing resources, the set of responses comprising a set of votes responsive to the request of the candidate computing resource to join the networked computing environment. In step S5, an authorization determination is made for the candidate computing resource to join the networked computing environment based on the set of votes.

While shown and described herein as a trust-based computing resource authorization solution, it is understood that the invention further provides various alternative embodiments. For example, in one embodiment, the invention provides a computer-readable/useable medium that includes computer program code to enable a computer infrastructure to provide trust-based computing resource authorization functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide trust-based computing resource authorization functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for trust-based computing resource authorization. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for trust-based computing resource authorization in a networked computing environment, comprising:

receiving, in a computer memory medium, a request for a candidate virtual machine-to join the networked computing environment as a computing resource that becomes a part of the networked computing environment and is available for use by other users in the networked computing environment;

identifying, based on a parsing of contextual metadata, a set of authorizing virtual machines that includes a plurality of virtual machines previously joined to the networked computing environment;

communicating an authorization message to every one of the set of authorizing virtual machines, the authorization message comprising metadata describing a set of attributes of the candidate virtual machine;

receiving a set of responses from the set of authorizing virtual machines, the set of responses comprising a set of votes responsive to the request of the candidate virtual machine to join the networked computing environment, and an indication whether any of the set of authorizing virtual machines requests the candidate virtual machine be configured for a particular authorizing virtual machine of the set of authorizing virtual machines, the set of responses further comprising a set of qualifiers that suggest a set of permission levels for the candidate virtual machines;

making an authorization determination for the candidate virtual machine to join the networked computing environment based on the set of votes, wherein the candidate virtual machine is authorized to join the networked computing environment if the set of votes to allow the candidate virtual machine to join the networked computing environment is greater than the set of votes expressly voting not to allow the candidate virtual machine to join the networked computing environment; and setting an authorization level for the candidate virtual machine based on the suggested set of permission levels.

2. The computer-implemented method of claim 1, further comprising returning a response to the candidate virtual machine, the response identifying the authorization level.

3. The computer-implemented method of claim 1, the set of qualifiers setting forth a set of priorities for the set of votes.

4. The computer-implemented method of claim 1, the set of votes comprising a set of codes having associated voting decisions.

5. The computer-implemented method of claim 1, the networked computing environment comprising a cloud computing environment.

6. A system for trust-based computing resource authorization in a networked computing environment, comprising:
 a bus;
 a processor coupled to the bus; and
 a memory medium coupled to the bus, the memory medium comprising instructions to:
 receive, in a computer memory medium, a request for a candidate virtual machine to join the networked computing environment as a computing resource that becomes a part of the networked computing environment and is available for use by other users in the networked computing environment;
 identify a set of authorizing virtual machines that includes a plurality of virtual machines previously joined to the networked computing environment;
 communicate an authorization message to every one of the set of authorizing virtual machines, the authorization message comprising metadata describing a set of attributes of the candidate virtual machine;
 receive a set of responses from the set of authorizing virtual machines, the set of responses comprising a set of votes responsive to the request of the candidate virtual machine to join the networked computing environment, and an indication whether any of the set of authorizing virtual machines requests the candidate virtual machine be configured for a particular authorizing virtual machine of the set of authorizing virtual machines, the set of responses further comprising a set of qualifiers that suggest a set of permission levels for the candidate virtual machines;

make an authorization determination for the candidate virtual machine to join the networked computing environment based on the set of votes, wherein the candidate virtual machine is authorized to join the networked computing environment if the set of votes to allow the candidate virtual machine to join the networked computing environment is greater than the set of votes expressly voting not to allow the candidate virtual machine to join the networked computing environment; and setting an authorization level for the candidate virtual machine based on the suggested set of permission levels.

7. The system of claim 6, the memory medium further comprising instructions to return a response to the candidate virtual machine, the response identifying the authorization level.

8. The computer-implemented method of claim 6, the set of qualifiers setting forth a set of priorities for the set of votes.

9. The system of claim 6, the set of votes comprising a set of codes having associated voting decisions.

10. The system of claim 6, the networked computing environment comprising a cloud computing environment.

11. A computer program product for trust-based computing resource authorization in a networked computing environment, the computer program product comprising a computer readable storage device, and program instructions stored on the computer readable storage media, to:

receive, in a computer memory medium, a request for a candidate virtual machine to join the networked computing environment as a computing resource that becomes a part of the networked computing environment and is available for use by other users in the networked computing environment;

identify a set of authorizing virtual machines that includes a plurality of virtual machines previously joined to the networked computing environment;

communicate an authorization message to every one of the set of authorizing virtual machines, the authorization message comprising metadata describing a set of attributes of the candidate virtual machine;

receive a set of responses from the set of authorizing virtual machines, the set of responses comprising a set of votes responsive to the request of the candidate virtual machine to join the networked computing environment, and an indication whether any of the set of authorizing virtual machines requests the candidate virtual machine be configured for a particular authorizing virtual machine of the set of authorizing virtual machines, the set of responses further comprising a set of qualifiers that suggest a set of permission levels for the candidate virtual machines;

make an authorization determination for the candidate virtual machine to join the networked computing environment based on the set of votes, wherein the candidate virtual machine is authorized to join the networked computing environment if the set of votes to allow the candidate virtual machine to join the networked computing environment is greater than the set of votes expressly voting not to allow the candidate virtual machine to join the networked computing environment; and set an authorization level for the candidate virtual machine based on the suggested set of permission levels.

12. The computer program product of claim 11, further comprising program instructions stored on the computer readable storage device-to return a response to the candidate virtual machine, the response identifying the authorization level.

13. The computer-implemented method of claim 11, the set of qualifiers setting forth a set of priorities for the set of votes.

14. The computer program product of claim 11, the set of votes comprising a set of codes having associated voting decisions.

15. The computer program product of claim 11, the networked computing environment comprising a cloud computing environment.

16. A method for deploying a system for trust-based computing resource authorization in a networked computing environment, comprising:

providing a computer infrastructure being operable to:

receive, in a computer memory medium, a request for a candidate virtual machine to join the networked computing environment as a computing resource that becomes a part of the networked computing environment and is available for use by other users in the networked computing environment;

identify a set of authorizing virtual machines that includes a plurality of virtual machines previously joined to the networked computing environment;

communicate an authorization message to every one of the set of authorizing virtual machines, the authorization message comprising metadata describing a set of attributes of the candidate virtual machine;

receive a set of responses from the set of authorizing virtual machines, the set of responses comprising a set of votes responsive to the request of the candidate virtual machine to join the networked computing environment, and an indication whether any of the set of authorizing virtual machines requests the candidate virtual machine be configured for a particular authorizing virtual machine of the set of authorizing virtual machines, the set of responses further comprising a set of qualifiers that suggest a set of permission levels for the candidate virtual machines;

make an authorization determination for the candidate virtual machine to join the networked computing environment based on the set of votes, wherein the candidate virtual machine is authorized to join the networked computing environment if the set of votes to allow the candidate virtual machine to join the networked computing environment is greater than the set of votes expressly voting not to allow the candidate virtual machine to join the networked computing environment; and set an authorization level for the candidate virtual machine based on the suggested set of permission levels.

\* \* \* \* \*